Figure 1:
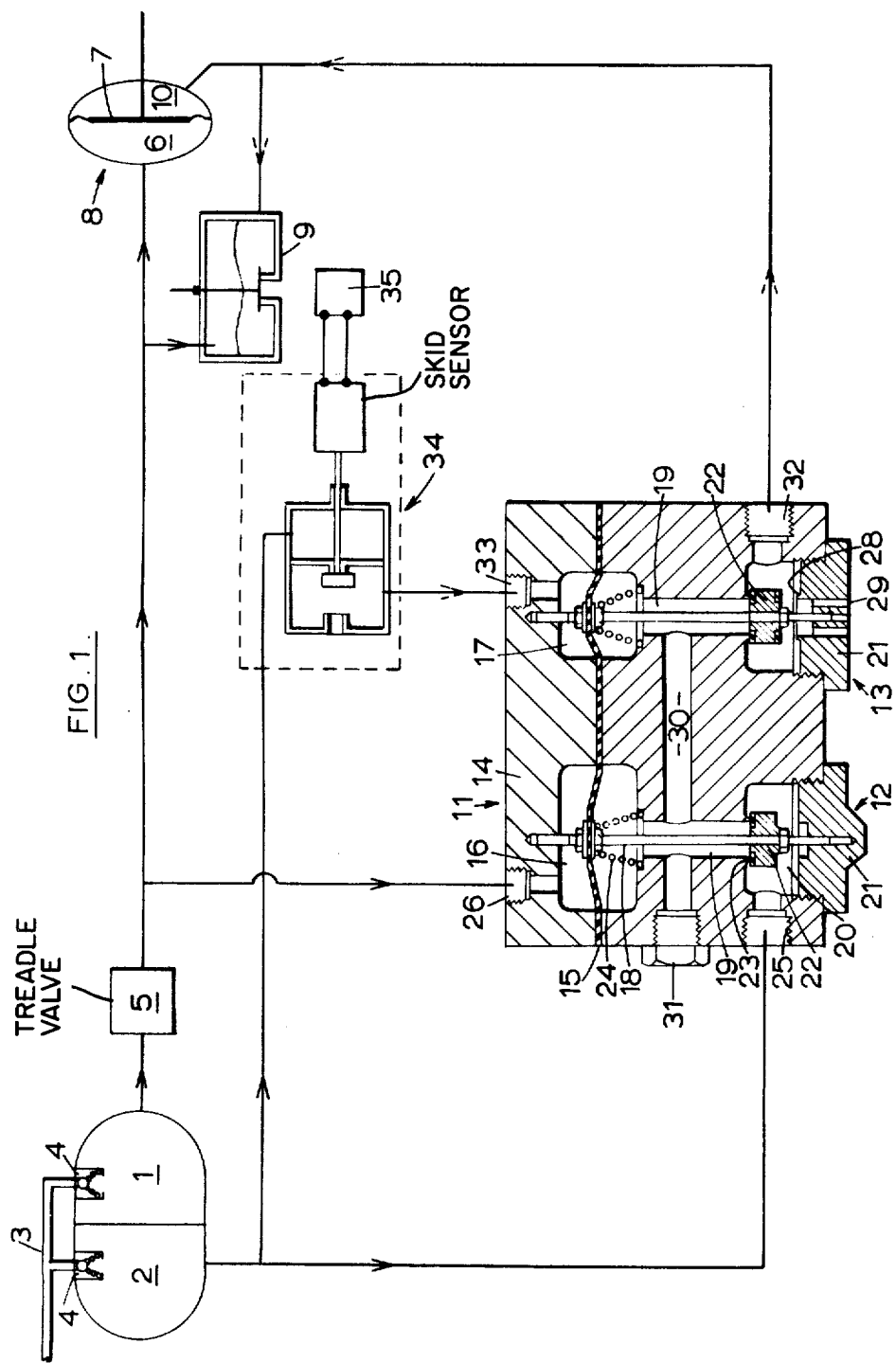

United States Patent [19]

Ingram et al.

[11] 3,937,524
[45] Feb. 10, 1976

[54] PNEUMATIC BRAKING SYSTEMS FOR VEHICLES

[75] Inventors: Brian Ingram, Balsall Common; Henry Jamieson Riddoch, Solihull, both of England

[73] Assignee: Girling Limited, Birmingham, England

[22] Filed: Dec. 8, 1972

[21] Appl. No.: 313,524

[30] Foreign Application Priority Data
Dec. 11, 1971  United Kingdom............... 57687/71

[52] U.S. Cl. ............................... 303/21 F; 303/40
[51] Int. Cl.² ........................................... B60T 8/02
[58] Field of Search...................... 303/21 F, 61–63, 303/68–69, 40; 188/181 A

[56] References Cited
UNITED STATES PATENTS

| | | |
|---|---|---|
| 3,633,978 | 1/1972 | Remillieux.................... 303/21 F |
| 3,674,317 | 7/1972 | Mangold.......................... 303/21 F |
| 3,754,794 | 8/1973 | Durand............................ 303/21 F |
| 3,767,271 | 10/1973 | Grosseau........................ 303/21 F |

Primary Examiner—George E. A. Halvosa
Assistant Examiner—Douglas C. Butler
Attorney, Agent, or Firm—Scrivener Parker Scrivener and Clarke

[57] ABSTRACT

In an anti-skid pneumatic braking system for vehicles a brake is applied by air from a first reservoir and the braking effort modulated by air from a second reservoir. The brake is connected to the second reservoir through two normally closed diaphragm valves in series, the first valve opened by air supplied to the brake from the first reservoir when the brake is applied and the second valve opened by air supplied from the second reservoir in skid conditions. Additionally a third normally closed diaphragm valve can be connected across the diaphragm of the brake actuator and is opened in skid conditions.

14 Claims, 2 Drawing Figures

PNEUMATIC BRAKING SYSTEMS FOR VEHICLES

This invention relates to a pneumatic braking system for vehicles, of the kind in which air from a pressurized reservoir is supplied to one side of a diaphragm of a brake actuator on application of the brake and means are provided for reducing the differential pressure across the diaphragm when a signal is received from skid sensing means.

According to the present invention a pneumatic braking system of the kind set forth comprises a second air reservoir connected to the second side of the diaphragm of the brake actuator through at least two normally closed valves, a first valve which is opened when the brake is applied and a second valve which is opened in response to a signal from the skid sensing means, the outlet of one valve being connected to the inlet of the other valve.

Preferably air supplied to the brake actuator from the first reservoir under the control of a brake applying valve actuates the first valve. Air from the second reservoir under the control of a solenoid valve may actuate the second valve, the solenoid valve being energized by the skid signal.

When the skid signal is cancelled the air on the second side of the diaphragm of the brake actuator is exhausted to increase the differential pressure across the diaphragm.

Preferably the second valve, controls an exhaust port connected to the second side of the diaphragm, the port being open when the valve is shut and shut when the valve is open. The size of the exhaust port may be restricted to control the rate at which the differential pressure across the diaphragm is restored.

Thus no air from the first reservoir is wasted in skid conditions.

In a modified form, the system may additionally comprise a normally closed third valve which is opened in response to a skid signal to connect the first side of the diaphragm to the second side and to cut off the supply of air to the first side of the diaphragm. Reducing the pressure on the first side of the diaphragm shortens the time the system takes to respond to a skid signal. Connecting the two sides of the diaphragm enables air from the second reservoir to re-pressurize the first side of the diaphragm while the skid signal persists, thus mitigating the loss of air from the first reservoir during skid conditions.

It is preferred to include a balance valve across the diaphragm of the brake actuator, the balance valve exhausting air from the second side of the diaphragm in the event that the pressure on the second side exceeds the pressure on the first side of the diaphragm.

For use in the first form of the system it is convenient to include the first and second valves in a single assembly and for the second form it is convenient to include the second, third valves and the solenoid valve in a single assembly.

Figure 2:
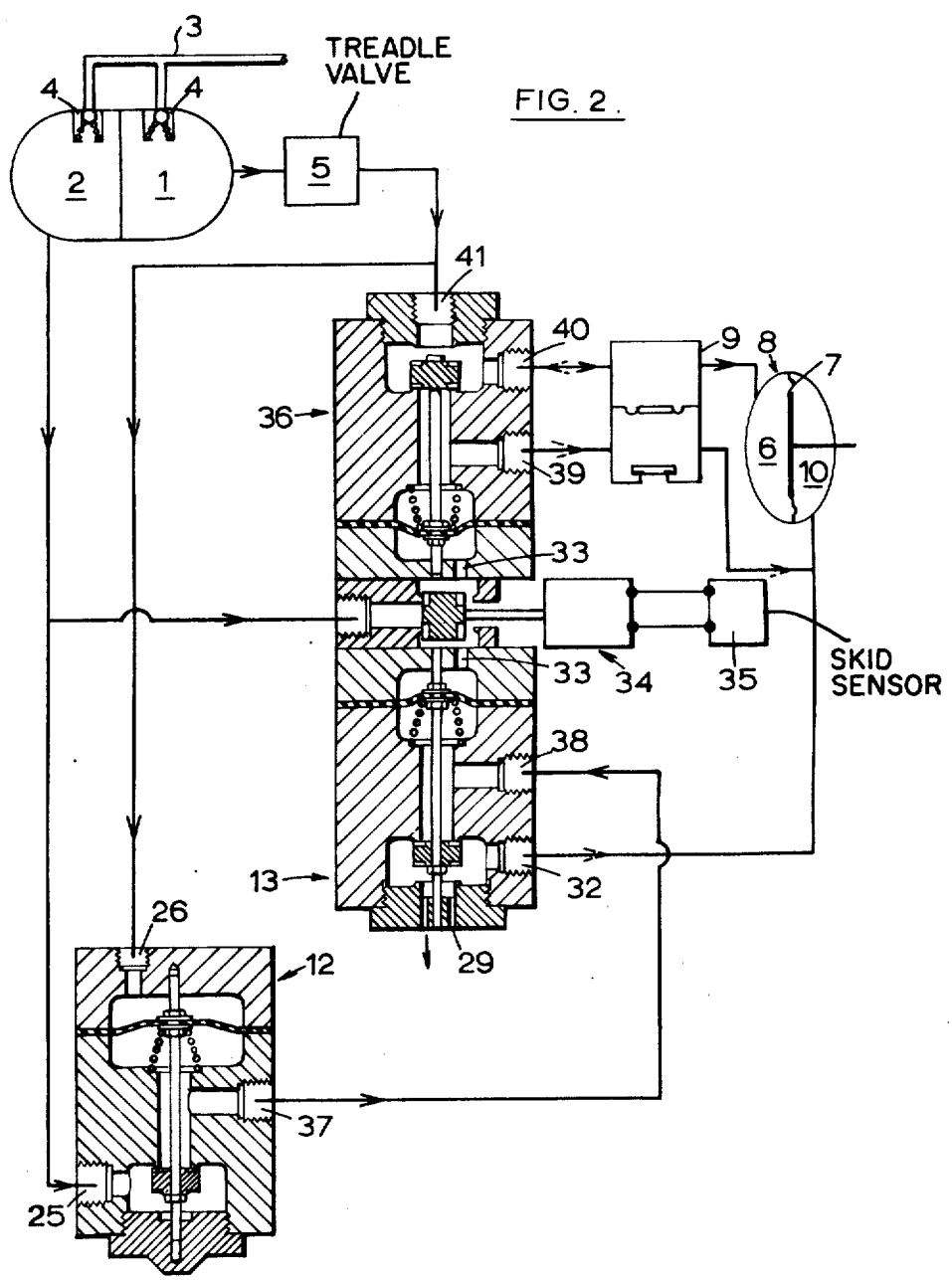

Two pneumatic braking systems according to our invention are illustrated as examples in FIGS. 1 and 2 of the accompanying drawings.

FIG. 1 shows a first air reservoir 1 and a second air reservoir 2 connected to a common supply line 3 through non-return valves 4. A brake applying treadle valve 5 operated by the driver allows air from reservoir 1 to pressurize the space 6 on one side of diaphragm 3 of a brake actuator 8. A diaphragm operated balance valve 9 is connected between space 6 and space 10 on the second side of diaphragm 7.

A valve assembly 11 includes two diaphragm valves 12 and 13 in a valve block 14. A common diaphragm 15 is clamped between upper and lower parts of the block 14 and mating recesses in the two parts form diaphragm chambers 16 and 17 for valves 12 and 13 respectively. The diaphragm in chamber 16 carries an axial spindle 18 which extends through a passage 19 leading from the chamber 16 to a recess 20 closed by a plug 21. The ends of the spindle 18 are guided in the block 14 and the plug 21. A valve member 22 on the spindle 18 is biassed to engage with a seating 23 at the lower end of passage 19 by a spring 24 acting between the block at the upper end of the passage and the connection between the spindle and the diaphragm. An inlet port 25 leads into recess 20 and is connected to reservoir 2, and a port 26 leading into chamber 16 above diaphragm 15 is connected to the line from reservoir 1 downstream of treadle valve 5.

Valve 13 need not be described in detail since it has the same construction as valve 12 except that the valve head 22 is adapted to co-operate with a second seating 28 around a third or exhaust port 29 in the plug 21. The inlet to valve 13 is formed by a transverse passage 30 interconnecting the two passages 19, this passage 30 also forming the outlet from valve 12. To enable the passage 30 to be drilled it extends to the exterior of block 14 where it is closed by a plug 31. An outlet port 32 of valve 13 is connected to space 10 in the brake actuator 8. A port 33 leading into the chamber 17 above the diaphragm is connected to reservoir 2 through a solenoid valve 34 which is opened by a signal from skid sensing means 35.

In operation treadle valve 5 is operated and air is allowed into space 6 of brake actuator 8 to move diaphragm 7 to the right to apply the brake. At the same time high pressure air enters chamber 16 through port 26 to act on diaphragm 15 and open valve 12 allowing air from reservoir 2 to enter the inlet of valve 13 through port 25, passage 19 and passage 30. If, during the brake application, a skid signal is received from skid sensing means 35, solenoid valve 34 is energized and pressurized air enters chamber 17 through port 33 to act on diaphragm 15 and open valve 13, closing port 29 and allowing air from reservoir 2 into space 10 of brake actuator 8. This reduces the differential pressure across diaphragm 7 and it moves to the left relieving the braking force. When the skid signal is cancelled, valve 13 closes connecting space 10 to exhaust port 29, increasing the differential pressure across diaphragm 7 and so increasing the braking force. The size of exhaust port 29 is chosen to throttle the release of air from space 10 and so control rate of increase of the braking force.

The advantage of this system over systems which dump air from space 6 of the brake actuator 8 on a skid signal is that no air is dumped from the main reservoir 1 during operation of the skid sensing means. Furthermore no air can be lost from the secondary reservoir 2 should the skid sensing means operate accidentally when the brakes have not been applied since valve 12 only opens when the brakes have been applied.

The system of FIG. 2 is similar to that of FIG. 1 and the same reference numerals have been used for equivalent integers. The main difference is that valve 12 has been separated from valve 13 which is now included in an assembly together with a third diaphragm valve 36 and the solenoid valve 34. Valve 12 now has an outlet port 37 connected to the inlet port 38 of valve 13. The outlet port 39 of valve 36 is connected to space 10 of brake actuator 8 via balance valve 9, in inlet port 40 is connected to the space 6 via balance valve 9, and the third port 41 is connected to the treadle valve 5. Valve 36 is also biassed to the closed position.

Solenoid valve 34 is located between valves 13 and 36 so that when valve 34 operates, air from reservoir 2 can operate both valves 13 and 36 simultaneously. Balance valve 9 is connected across valve 36 to ensure that no air is trapped in space 10.

The operation of this system is the same as the system of FIG. 1 except that on a skid signal valve 36 opens, interrupting the supply of air from reservoir 1 to space 6 and interconnecting spaces 6 and 10 of the brake actuator. When this occurs the differential pressure across diaphragm 7 is reduced very rapidly, relieving the braking force. Also air is supplied to spaces 6 and 10 from reservoir 2 building up the pressure to its original value. Thus the air dumped from reservoir 1 to space 10 is replaced by air from reservoir 2.

The advantage of this system over the system of FIG. 1 is the shorter response time to a skid signal. The advantage of this system over a system which only interconnects opposite sides of the diaphragm on a skid signal is that at least some of the main air supply which is dumped, is replaced from a secondary supply.

In both the systems of FIGS. 1 and 2 the addition of skid sensing and control means does not rely on use of air from the main reservoir 1 and thereform the security of the main braking supply is safeguarded.

We claim:

1. A pneumatic braking system for vehicles comprising a diaphragm brake actuator, a first reservoir for pressurized air connected through a brake applying valve to one side of the brake actuator for applying the brake, a second reservoir for pressurized air, a normally closed first valve having its inlet connected to said second reservoir, a normally closed second valve having its inlet connected to the outlet of said first valve and its outlet connected to the second side of said actuator, means for opening the first valve in response to opening of the brake applying valve, skid sensing means, and means for opening the second valve in response to a signal from the skid sensing means, whereby pressurized air is supplied to the second side of the brake actuator from the second reservoir when the brake has been applied and a skid signal received.

2. A braking system as in claim 1 wherein the first valve is responsive to air pressure downstream of the brake applying valve.

3. A braking system as in claim 2 wherein a normally closed solenoid valve, which is energized by a signal from the skid sensing means, controls a supply of air from the second reservoir and the second valve is responsive to air pressure downstream of the solenoid valve.

4. A braking system as in claim 3 wherein the first and second valve each have a diaphragm carrying a valve member spring biassed into engagement with a seating between inlet and outlet, the space above the diaphragm in the first valve being connected to a line between the first reservoir and the brake actuator downstream of the brake applying valve, and the space above the diaphragm in the second valve being connected to the second reservoir through the solenoid valve.

5. A braking system as in claim 4 wherein the valve member of the second valve is adapted, when the valve is opened, to engage a second seating between the outlet and an exhaust port.

6. A braking system as in claim 5 wherein the first and second valves are included in a single assembly having a common passage forming the outlet of the first valve and the inlet of the second valve.

7. A braking system as in claim 6 wherein the first and second valves have a common diaphragm clamped between two parts of the valve assembly, mating recesses in the two parts forming a diaphragm chamber for each valve.

8. A braking system as in claim 5 wherein the inlet and outlet of a third valve, being a double-seat diaphragm valve similar to the second valve, are respectively connected to the first and second sides of the diaphragm of the brake actuator, the third port is connected to the line between the first reservoir and the brake actuator downstream of the brake applying valve, and the space above the diaphragm is connected to the second reservoir through the solenoid valve.

9. A braking system as in claim 8 wherein the solenoid valve is located between the second and third valves in a single valve assembly.

10. For the braking system of claim 8, a valve assembly comprising two double seat diaphragm valves arranged with the axes of the diaphragms in alignment and separated by a solenoid valve, the outlet of the solenoid valve opening into the space above the diaphragm in each of the diaphragm valves.

11. For the braking system of claim 5, a valve assembly comprising a single seat diaphragm valve and a double seat diaphragm valve located with the axes of the diaphragms side-by-side, a common diaphragm for both valves being clamped between two parts of the assembly, and a common passage in the assembly forming the outlet of the single seat valve and the inlet of the double seat valve.

12. A braking system as in claim 1 wherein the second valve includes a normally open exhaust port connected to the second side of the diaphragm of the brake actuator, the exhaust port being closed when the valve is opened.

13. A braking system as in claim 1 wherein the size of the exhaust port is restricted thereby controlling the rate at which the differential pressure across the diaphragm is restored on cancellation of a skid signal.

14. A pneumatic braking system for vehicles comprising a diaphragm brake acutator, a first reservoir for pressurized air connected through a brake applying valve to one side of the brake actuator for applying the brake, a second reservoir for pressurized air, a normally closed first valve having its inlet connected to said second reservoir, a normally closed second valve having its inlet connected to the outlet of said first valve and its outlet connected to the second side of said actuator, means for opening the first valve in response to opening of the brake applying valve, skid sensing means, and means for opening the second valve in response to a signal from the skid sensing means, whereby pressurized air is supplied to the second side of the brake actuator from the second reservoir when the brake has been applied and a skid signal received, and a normally closed third valve which is opened in response to a skid signal to connect the first and second sides of the diaphragm of the brake actuator and to cut off the supply of air from the first reservoir to the first side of the diaphragm.

* * * * *